United States Patent
Motooka et al.

(10) Patent No.: US 12,535,597 B2
(45) Date of Patent: Jan. 27, 2026

(54) POSITIONING APPARATUS, COMPUTER READABLE MEDIUM, AND POSITIONING METHOD

(71) Applicant: Mitsubishi Electric Corporation, Tokyo (JP)

(72) Inventors: Norizumi Motooka, Tokyo (JP); Takamasa Kawaguchi, Tokyo (JP); Masayasu Fujita, Tokyo (JP); Yuki Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 18/277,076

(22) PCT Filed: Oct. 4, 2021

(86) PCT No.: PCT/JP2021/036546
§ 371 (c)(1),
(2) Date: Aug. 14, 2023

(87) PCT Pub. No.: WO2022/201606
PCT Pub. Date: Sep. 29, 2022

(65) Prior Publication Data
US 2024/0118434 A1    Apr. 11, 2024

(51) Int. Cl.
*G01S 19/00*    (2010.01)
*G01S 19/39*    (2010.01)
*G01S 19/41*    (2010.01)

(52) U.S. Cl.
CPC ............ *G01S 19/41* (2013.01); *G01S 19/396* (2019.08)

(58) Field of Classification Search
CPC ........ G01S 19/41; G01S 19/396; G01S 19/33; G01S 19/40; G01S 19/425; G01S 19/43
See application file for complete search history.

(56) References Cited

U.S. PATENT DOCUMENTS

| | | | |
|---|---|---|---|
| 10,775,513 B1 * | 9/2020 | Averin | G01S 19/55 |
| 2010/0156709 A1 * | 6/2010 | Zhang | G01S 19/41 |
| | | | 342/357.23 |

(Continued)

FOREIGN PATENT DOCUMENTS

| CN | 112083462 A | 12/2020 |
|---|---|---|
| EP | 3 206 050 A1 | 8/2017 |

(Continued)

OTHER PUBLICATIONS

Yu, W et al. Precise point positioning with mixed use of time-differenced and undifferenced carrier phase from multiple GNSS. J Geod 93, 809-818 (2019) [online], [retrieved on Mar. 28, 2025]. Retrieved from the Internet <URL:https://doi.org/10.1007/s00190-018-1201-8 > (Year: 2019).*

(Continued)

*Primary Examiner* — Peter D Nolan
*Assistant Examiner* — Peter Y Ning
(74) *Attorney, Agent, or Firm* — XSENSUS LLP (57) ABSTRACT

A positioning apparatus (100) detects pseudo ranges and carrier phase integrated values from ranging signals (L1C/A) for which augmentation information ([LC/A]) is provided, detects pseudo ranges and carrier phase integrated values from ranging signals (B1C) for which augmentation information is not provided, acquires correction data ([LC/A]) for the ranging signals generated from the augmentation information, corrects the pseudo ranges and the carrier phase integrated values of the ranging signals (L1C/A) with the correction data ([LC/A]), generates a first observation equation using the corrected pseudo ranges and carrier phase integrated values of the ranging signals (L1C/A), generates a second observation equation using a time difference value between the pseudo ranges and a time difference value between the carrier phase integrated values of the ranging (Continued)

signals (B1C), and performs positioning by executing a filter operation using the first observation equation and the second observation equation.

15 Claims, 7 Drawing Sheets

(56) References Cited

U.S. PATENT DOCUMENTS

| | | | |
|---|---|---|---|
| 2013/0271318 A1* | 10/2013 | Doucet | G01S 19/44 |
| | | | 342/357.64 |
| 2013/0335266 A1* | 12/2013 | Vollath | G01S 19/07 |
| | | | 342/357.25 |
| 2016/0377736 A1* | 12/2016 | Zeitzew | G01S 19/43 |
| | | | 342/357.34 |
| 2017/0090038 A1* | 3/2017 | Saito | G01S 19/41 |
| 2017/0176600 A1* | 6/2017 | Vollath | G01S 19/41 |
| 2017/0299728 A1* | 10/2017 | Lie | G01S 19/43 |
| 2017/0299730 A1 | 10/2017 | Lie et al. | |
| 2017/0299731 A1 | 10/2017 | Lie et al. | |
| 2019/0324153 A1* | 10/2019 | Chen | G01S 19/43 |
| 2020/0025938 A1 | 1/2020 | Vollath | |
| 2021/0190967 A1 | 6/2021 | Vollath | |
| 2022/0003879 A1 | 1/2022 | Zeitzew et al. | |

FOREIGN PATENT DOCUMENTS

| | | |
|---|---|---|
| EP | 3 525 011 A2 | 8/2019 |
| JP | 2009-257802 A | 11/2009 |
| JP | 2019-045499 A | 3/2019 |
| JP | 2019-211445 A | 12/2019 |
| WO | 2012/151006 A1 | 11/2012 |
| WO | 2015/145719 A1 | 10/2015 |
| WO | 2017/003776 A1 | 1/2017 |
| WO | 2017/004033 A1 | 1/2017 |
| WO | 2017/004041 A1 | 1/2017 |
| WO | 2017/004047 A1 | 1/2017 |
| WO | 2019/203679 A1 | 10/2019 |

OTHER PUBLICATIONS

Extended European Search Report issued Jan. 8, 2025, in corresponding European Patent Application No. 21933204.6, 16pp.
Yu Wenken et al: "Precise point positioning with mixed use of time-differenced and undifferenced carrier phase from multiple GNSS", Journal of Geodesy, Springer Berlin Heidelberg, Berlin/Heidelberg, vol. 93, No. 6, Sep. 22, 2018 (Sep. 22, 2018), pp. 809-818, XP036776433.
Communication pursuant to Rule 164(1) EPC issued Aug. 30, 2024, in corresponding European Patent Application No. 21933204.6, 17pp.
Freda et al., "Time-differenced carrier phases technique for precise GNSS velocity estimation", GPS solutions, vol. 19, DOI 10.1007/s10291-014-0425-1, Dec. 31, 2014, pp. 335-341.
International Search Report and Written Opinion mailed on Dec. 21, 2021, received for PCT Application PCT/JP2021/036546, filed on Oct. 4, 2021, 8 pages including English Translation.
International Search Report and Written Opinion mailed on May 25, 2021, received for PCT Application PCT/JP2021/012377, filed on Mar. 24, 2021, 8 pages including English Translation.

* cited by examiner

POSITIONING APPARATUS, COMPUTER READABLE MEDIUM, AND POSITIONING METHOD

CROSS-REFERENCE TO RELATED APPLICATIONS

The present application is based on PCT filing PCT/JP2021/036546, filed Oct. 4, 2021, which claims priority from PCT filing PCT/JP2021/012377, filed Mar. 24, 2021, the entire contents of each are incorporated herein by reference.

TECHNICAL FIELD

The present disclosure relates to a positioning apparatus, a positioning program, and a positioning method.

BACKGROUND ART

Satellite positioning has a positioning technique that obtains a high-precision positioning solution by correcting an error contained in a ranging signal transmitted by a positioning satellite using positioning augmentation information (hereinafter referred to as augmentation information) and solving an indefinite integer bias in a carrier phase integrated value. Augmentation information as error information is provided as a quantity of state corresponding to each error factor, and PPP-AR (Precise Point Positioning Ambiguity Resolution) and PPP-RTK (Precise Point Positioning Real-Time Kinematic) are available as techniques for performing high-precision positioning using augmentation information.

In a PPP-AR positioning system, a positioning apparatus of a user acquires information related to a satellite orbit error $\delta O$, a satellite clock error $\delta T$, and a satellite signal bias B and corrects an error contained in a ranging signal. A satellite signal bias B as error information is different for every signal type, such as L1C/A, L2P, or L2C. For this reason, a satellite signal bias B is provided for every signal type, such as L1C/A, L2P, or L2C, to the positioning apparatus of the user. In PPP-AR, a tropospheric propagation delay error T and an ionospheric propagation delay error I (hereinafter referred to as the tropospheric delay error T and the ionospheric delay error I) are corrected with a model or are estimated and removed by an estimation filter, such as a Kalman filter.

In a PPP-RTK positioning system, error information related to a tropospheric delay error T and an ionospheric delay error I is provided, in addition to a satellite orbit error $\delta O$, a satellite clock error $\delta T$, and a satellite signal bias B. A positioning apparatus of a user can correct an error contained in a ranging signal based on these pieces of error information ($\delta O$, $\delta T$, B, T, and I).

Time difference positioning is available as a technique for implementing high-precision positioning without any error information (for example, Patent Literature 1).

In use of a positioning technique, such as RTK, PPP-AR, or PPP-RTK, by which a high-precision positioning solution is obtained, a positioning satellite available for use in precision positioning is limited to a positioning satellite for which augmentation information is provided. That is, in the case of a positioning satellite for which augmentation information is not provided, if a positioning apparatus of a user can acquire a ranging signal from the positioning satellite, for which augmentation information is not provided, the ranging signal cannot be used for precise positioning. For this reason, positioning in an urban area where a ranging signal is likely to be blocked by a building suffers from the problems of limitations to the number of satellites available for use in positioning and reduction in positioning precision. For example, in Centimeter Level Augmentation Service for quasi-zenith satellites, augmentation information to be provided to a user is limited to GPS satellites of the US, Galilean satellites of Europe, and quasi-zenith satellites of Japan. For this reason, augmentation information is not provided for GLONASS satellites of Russia, NavIC satellites of India, and Beidou satellites of China. Thus, ranging signals of GLONASS satellites, NavIC satellites, and Beidou satellites cannot be used for precise positioning.

Patent Literature 1 is confined to disclosure related to a technique for precisely determining a change of user position with time using time difference positioning and makes no disclosure of a technique for determining an absolute position.

CITATION LIST

Patent Literature

Patent Literature 1: JP 2019-45499

SUMMARY OF INVENTION

Technical Problem

The present disclosure has as its object to provide a positioning system which uses a ranging signal for which augmentation information is not provided together with a ranging signal for which augmentation information is provided to perform high-precision positioning in a precise positioning system which corrects a ranging signal using augmentation information.

Solution to Problem

A positioning apparatus includes:

a detection unit to detect first pseudo ranges and first carrier phase integrated values from first ranging signals which are ranging signals of a first positioning satellite received at a plurality of times and are ranging signals for which augmentation information for correction is provided and to detect second pseudo ranges and second carrier phase integrated values from second ranging signals which are ranging signals of a second positioning satellite received at a plurality of times and are ranging signals for which augmentation information for correction is not provided;

an error correction unit to acquire correction data for the first ranging signals generated from the augmentation information provided for the first ranging signals and the first pseudo ranges and the first carrier phase integrated values detected by the detection unit and to correct the first pseudo ranges and the first carrier phase integrated values using the correction data; and a positioning operation unit to generate a first observation equation for the first positioning satellite using the first pseudo ranges and the first carrier phase integrated values corrected by the error correction unit, to generate a second observation equation for the second positioning satellite using a time difference value between the second pseudo ranges and a time difference value between the second carrier phase integrated values, and to perform positioning by executing a filter operation using the first observation equation and the second observation equation.

Advantageous Effects of Invention

According to the present disclosure, it is possible to provide a positioning system which uses a ranging signal for which augmentation information is not provided together with a ranging signal for which augmentation information is provided to perform high-precision positioning in a precise positioning system which corrects a ranging signal using augmentation information. For this reason, ranging signals available for use in positioning calculation increases, and the number of satellites available for use in positioning can be increased in positioning in an urban area where a ranging signal is likely to be blocked by a building.

DESCRIPTION OF EMBODIMENTS

In the description of an embodiment and the drawings, same elements and corresponding elements are denoted by same reference characters. A description of elements denoted by same reference characters will be appropriately omitted or simplified. In the following embodiment, the term "unit" may be appropriately replaced with the term "circuit", "step", "procedure", "process", or "circuitry".

Embodiment 1

Embodiment 1 will be described with reference to FIGS. 1 to 7.

Figure 1:
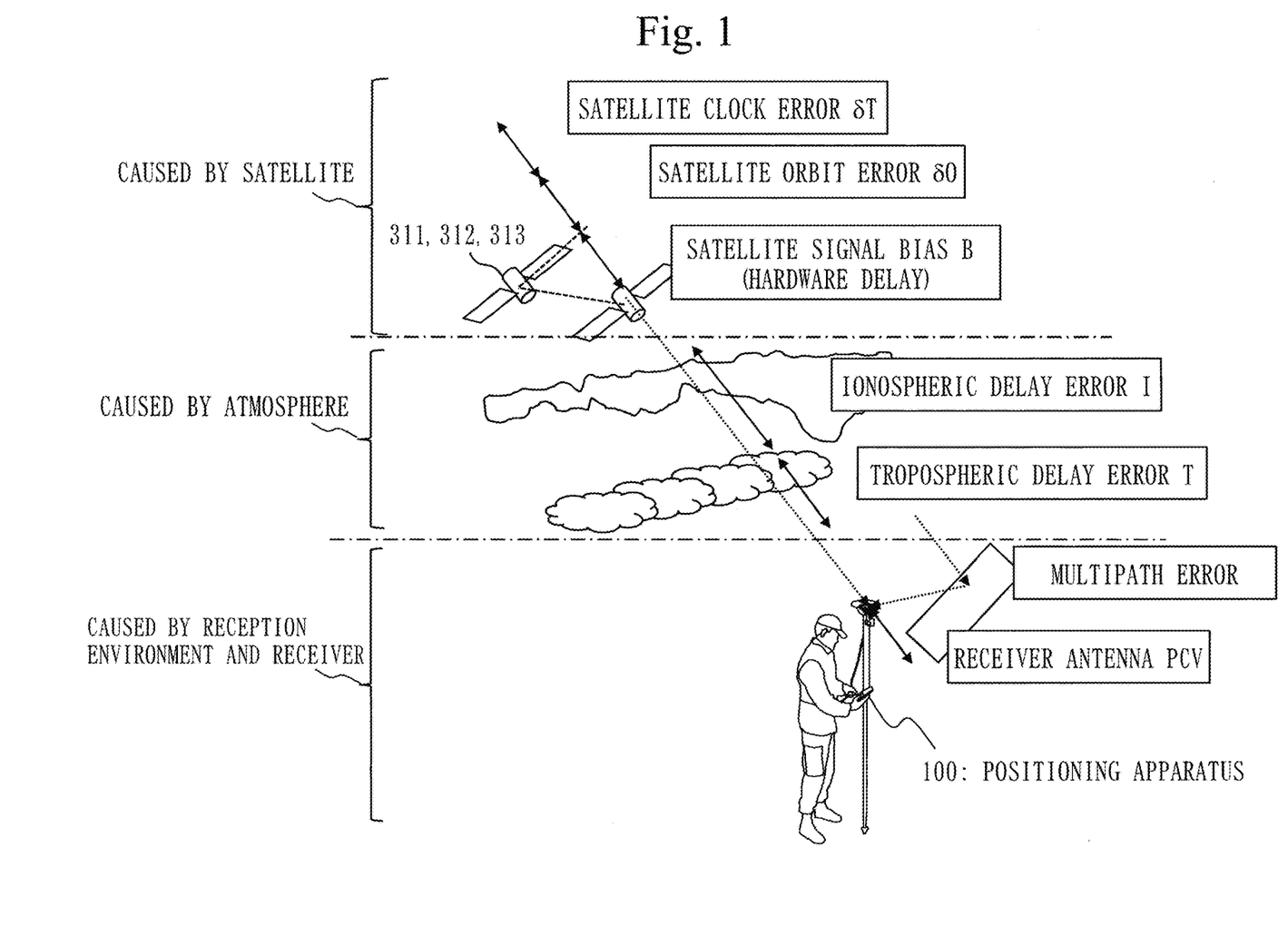
FIG. 1 is a diagram according to Embodiment 1 and is a diagram for explaining positioning error factors in use of ranging signals.

FIG. 1 is a diagram for explaining error factors in positioning using a ranging signal, such as a L1C/A signal, to be transmitted by a GPS satellite 311.

Figure 2:
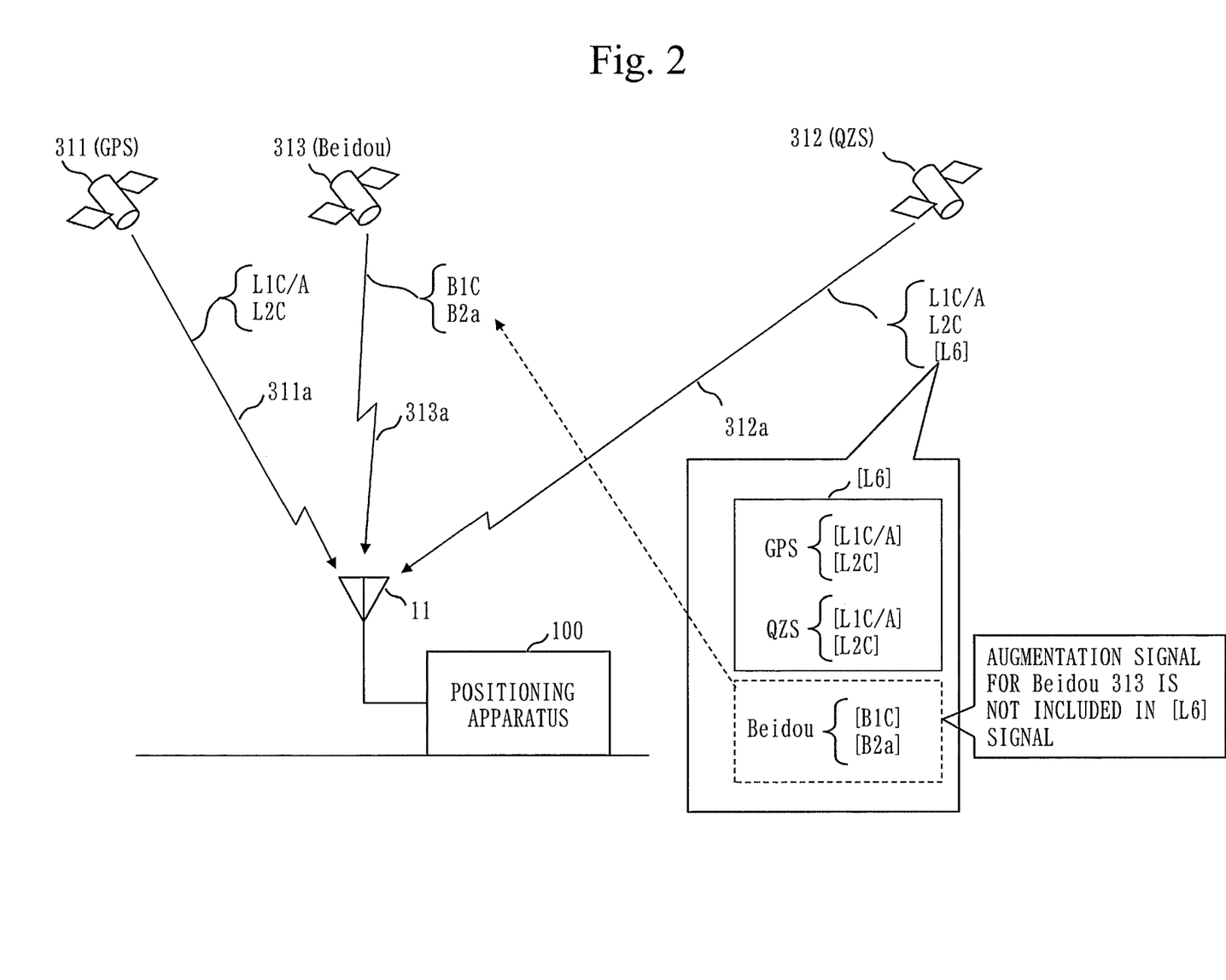
FIG. 2 is a diagram according to Embodiment 1 and is a diagram showing signals to be transmitted by a GPS satellite 311, a quasi-zenith satellite 312, and a Beidou satellite 313.

FIG. 2 shows signals to be transmitted by the GPS satellite 311, a quasi-zenith satellite 312, and a Beidou satellite 313.

The GPS satellite 311 transmits a transmission signal 311a. The transmission signal 311a includes a L1C/A signal and a L2C signal as ranging signals. The quasi-zenith satellite 312 transmits a transmission signal 312a. The transmission signal 312a includes a L1C/A signal and a L2C signal as ranging signals and a [L6] signal as augmentation information. The [L6] signal as the augmentation information is referred to as the augmentation information [L6]. A positioning apparatus 100 receives augmentation information. The augmentation information subjected to decoding by a third decoding unit 23 of the positioning apparatus 100 is called correction data. The augmentation information [L6] includes a plurality of individual pieces of augmentation information [i] which are used for ranging signals i. The individual augmentation information [i] is decoded by the third decoding unit 23 to become correction data. The augmentation information [L6] includes augmentation information [L1C/A] and augmentation information [L2C] for a L1C/A signal and a L2C signal as ranging signals to be transmitted by the GPS satellite 311. The augmentation information [L6] includes augmentation information [L1C/A] and augmentation information [L2C] for a L1C/A signal and a L2C signal as ranging signals to be transmitted by the quasi-zenith satellite 312.

Assume below an example in which the quasi-zenith satellite 312 transmits a [L6] signal as augmentation information. Augmentation information [L6] may be information adherent to an SSR compression format (CompactSSR) corresponding to PPP-RTK capable of centimeter level positioning, as a state space representation. Note that transmission of augmentation information as a [L6] signal from the quasi-zenith satellite 312 is one example. The positioning apparatus 100 need not receive augmentation information from the quasi-zenith satellite 312 and may receive augmentation information via the Internet or from a mobile carrier communication network.

Reference is made to FIG. 1. Positioning using ranging signals to be transmitted by positioning satellites, such as the GPS satellite 311, the quasi-zenith satellite 312, and the Beidou satellite 313, of a GNSS (Global Navigation Satellite System) has the error factors below. As shown in FIG. 1, factors in a positioning error caused by a satellite include a satellite clock error δT, and errors caused by a positioning satellite include an orbit error δO and a satellite signal bias B. Errors caused by a propagation path for a ranging signal include an ionospheric delay error I and a tropospheric delay error T. Errors caused by a reception circuit of the positioning apparatus 100 include a receiver clock error and a receiver noise. Additionally, multipath caused by interference between a ranging signal reflected from a building and a ranging signal directly received from a positioning satellite becomes an error factor in positioning.

If positioning using augmentation information [L6] provided in a State Space Representation (SSR) is performed, error correction cannot be performed on a ranging signal i which does not coincide with individual augmentation information [i] of any type included in the augmentation information [L6]. A description will be given with reference to FIG. 2. Augmentation information [L1C/A] and augmentation information [L2C] for a L1C/A signal and a L2C signal which are ranging signals of the GPS satellite 311 are included in the augmentation information [L6]. The same applies to the quasi-zenith satellite 312. Thus, ranging signals i transmitted by the GPS satellite 311 and the quasi-zenith satellite 312 can be corrected with pieces of augmentation information [i] included in the augmentation information [L6]. However, augmentation information [B1C] and augmentation information [B2a] for a B1C signal and a B2a signal which are ranging signals of the Beidou satellite 313 are not included in the augmentation information [L6]. For this reason, the ranging signals B1C and B2a of the Beidou satellite 313 cannot be used for positioning calculation. Under the circumstances, the positioning apparatus 100 provides a mechanism to allow a ranging signal i for which the positioning apparatus 100 cannot receive augmentation information [i] to be used for positioning calculation. Operation of the mechanism will be described with reference to operation in FIG. 4.

Description of Configuration

Figure 3:
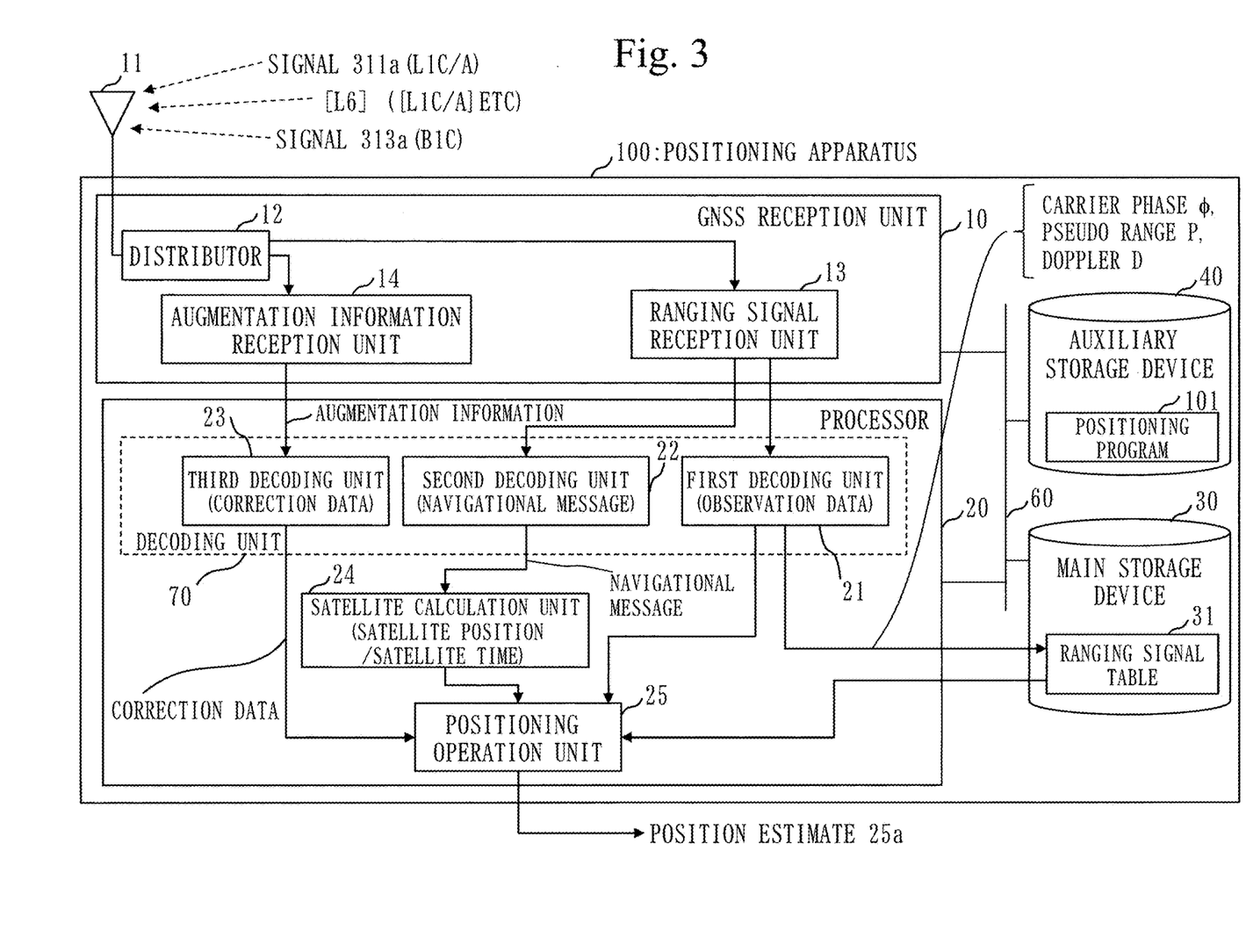
FIG. 3 is a diagram according to Embodiment 1 and is a hardware configuration diagram of a positioning apparatus 100.

FIG. 3 shows a hardware configuration of the positioning apparatus 100. The positioning apparatus 100 will be described with reference to FIG. 3. The positioning apparatus 100 performs positioning using a PPP-RTK positioning system. Note that although a description will be given taking PPP-RTK as an example, implementation of a different precise positioning system, such as PPP-AR or RTK, is also possible.

The feature of the positioning apparatus 100 is as follows. If a ranging signal i transmitted by a positioning satellite i does not coincide with any positioning satellite signal type of individual augmentation information as error information, such as "a signal bias in pseudo range" or "a signal bias in carrier phase integrated value", included in augmentation information [L6], augmentation information [k] (k≠i) cannot be normally applied to the ranging signal i. In such a case, the positioning apparatus 100 can use the ranging signal i, for which augmentation information [i] is not provided, for precise positioning by using a time difference value ΔP in pseudo range and a time difference value Δϕ in carrier phase integrated value, as will be described later.

As shown in FIG. 3, the positioning apparatus 100 includes, as hardware, a GNSS reception unit 10, a processor 20, a main storage device 30, and an auxiliary storage device 40. The pieces of hardware are connected by signal lines 60.

The GNSS reception unit 10 includes an antenna 11, a distributor 12, a ranging signal reception unit 13, and an augmentation information reception unit 14. The antenna 11 receives the transmission signal 311a, the transmission signal 312a, and a transmission signal 313a from the GPS satellite 311, the quasi-zenith satellite 312, and the Beidou satellite 313. The distributor 12 distributes signals received by the antenna 11 between the ranging signal reception unit 13 and the augmentation information reception unit 14. The ranging signal reception unit 13 transmits, of signals distributed from the distributor 12, ranging signals to a first decoding unit 21 and a second decoding unit 22. The ranging signal reception unit 13 transmits a carrier phase integrated value ϕ, a pseudo range P, and Doppler D to the first decoding unit 21 and transmits a navigational message to the second decoding unit 22. The augmentation information reception unit 14 transmits, of the signals distributed from the distributor 12, augmentation information [L6] to the third decoding unit 23.

The processor 20 includes the first decoding unit 21, the second decoding unit 22, the third decoding unit 23, a satellite calculation unit 24, and a positioning operation unit 25. The first decoding unit 21, the second decoding unit 22, and the third decoding unit 23 constitute a decoding unit 70. The above-described functional units are implemented by a positioning program 101. The positioning program 101 is stored in the auxiliary storage device 40. The positioning program 101 is a program which causes a computer to execute processes, procedures, or steps obtained by replacing the term "unit" in the first decoding unit 21, the second decoding unit 22, the third decoding unit 23, the satellite calculation unit 24, and the positioning operation unit 25 with the term "process", "procedure", or "step". A positioning method is a method which is practiced though execution of the positioning program 101 by the positioning apparatus 100 as a computer. That is, the positioning apparatus 100 as the computer executes the positioning method. The positioning program 101 may be provided while being stored in a computer-readable recording medium or provided as a program product.

As will be described later in FIG. 4, the positioning operation unit 25 includes a positioning filter 26, an error correction unit 27, and a time difference calculation unit 28. As will be described later in FIG. 5, the positioning operation unit 25 may further include a drift correction unit 29.

The GNSS reception unit 10 receives a transmission signal transmitted by a positioning satellite. A navigational message and ranging signals are included in each of the transmission signal 311a of the GPS satellite 311 and the transmission signal 313a of the Beidou satellite 313. Augmentation information [L6] is included in the transmission signal 312a of the quasi-zenith satellite 312, in addition to a navigational message and ranging signals. A carrier phase integrated value ϕ, a pseudo range P, and Doppler D are included in a ranging signal to be transmitted by each positioning satellite.

An observation equation related to a pseudo range <P(tk)> of a positioning satellite SAT at a time tk corrected with augmentation information [L6] is represented by (expression 1) below:

$$<P(tk)>=\rho(tk)+c\times\delta t(tk)+\varepsilon p(tk) \qquad (1)$$

In (expression 1), ρ(tk) is a geometric distance between the positioning apparatus 100 and the positioning satellite SAT, c is a light speed, δt(tk) is a clock error of the positioning apparatus 100, and εp(tk) is an observation noise error.

The clock error of the positioning apparatus 100 may be canceled by calculating a between-satellite difference <ΔPab(tk)> between a pseudo range <Pa(tk)> of a positioning satellite SATa corrected with the augmentation information [L6] and a pseudo range <Pb(tk)> of a positioning satellite SATb corrected with the augmentation information [L6], as represented by (expression 2):

$$<\Delta Pab(tk)>=<Pa(tk)>-<Pb(tk)>=\rho a(tk)-\rho b(tk)+\varepsilon pa(tk)-\varepsilon pb(tk) \qquad (2)$$

An observation equation related to a carrier phase integrated value <ϕ(tk)> of the positioning satellite SAT at the time tk corrected with the augmentation information [L6] is represented by (expression 3) below:

$$<\phi(tk)>=\rho(tk)+c\times\delta t(tk)+\lambda\times N(tk)+\varepsilon\phi(tk) \qquad (3)$$

In (expression 3), ρ(tk) is the geometric distance between the positioning apparatus 100 and the positioning satellite SAT, c is the light speed, δt(tk) is the clock error of the positioning apparatus 100, and εϕ(tk) is an observation noise error.

The clock error of the positioning apparatus 100 may be canceled by calculating a between-satellite difference <Δϕab(tk)> between a carrier phase integrated value <ϕa(tk)> of the positioning satellite SATa corrected with the augmentation information [L6] and a carrier phase integrated value <ϕb(tk)> of the positioning satellite SATb corrected with the augmentation information [L6], as represented by (expression 4):

$$<\Delta\phi ab(tk)>=<\phi a(tk)>-<\phi b(tk)>=\rho a(tk)-\rho b(tk)+\varepsilon pa(tk)-\varepsilon pb(tk) \qquad (4)$$

Observation equations related to a time difference ΔP in a pseudo range P and a time difference Δϕ in a carrier phase integrated value ϕ will be illustrated below.

<A. Observation Model for Pseudo Range>

An observation equation for a pseudo range P(tk) at the time tk is represented by (expression 5) below. Such an observation equation is defined individually for each signal of the positioning satellite SAT.

$$P(tk)=\rho(tk)+\delta O(tk)+c \times \delta t(tk)-c \times \delta T(tk)+I(tk)+T(tk)+Bp(tk)+\varepsilon p(tk) \quad (5)$$

In (expression 5), the meanings of the symbols are as follows. ρ(tk) is the geometric distance between the positioning apparatus 100 and the positioning satellite SAT.
  δO(tk) is an orbit error of the positioning satellite SAT.
  c is the light speed, and
  δt(tk) is the clock error of the positioning apparatus 100.
  δT(tk) is a clock error of the positioning satellite SAT.
  I(tk) is an ionospheric delay error.
  T(tk) is a tropospheric delay error.
  Bp(tk) is a code bias error of the positioning apparatus 100 and the positioning satellite SAT.
  εp(tk) is the observation noise error.

<B. Observation Model for Carrier Phase Integrated Value>

An observation equation for a carrier phase integrated value φ(tk) at the time tk is represented by (expression 6) below. Such an observation equation is defined individually for each signal of the positioning satellite SAT.

$$\phi(tk)=\rho(tk)+\delta O(tk)+c \times \delta t(tk)-c \times \delta T(tk)-I(tk)+T(tk)+B\phi(tk)+\lambda \times N(tk)+\varepsilon \phi(tk) \quad (6)$$

In (expression 6), ρ(tk) is the geometric distance between the positioning apparatus 100 and the positioning satellite SAT. δO(tk) is the orbit error of the positioning satellite SAT, c is the light speed, δt(tk) is the clock error of the positioning apparatus 100, δT(tk) is the clock error of the positioning satellite SAT, I(tk) is the ionospheric delay error, T(tk) is the tropospheric delay error, Bφ(tk) is a carrier phase integrated value bias error of the positioning apparatus 100 and the positioning satellite SAT, λ is a carrier phase wavelength, N(tk) is ambiguity, and εφ(tk) is the observation noise error.

<C. Expression for Time Difference Value ΔP in Pseudo Range>

If a difference between a time tk−1 and the time tk is sufficiently small, a time difference ΔP(tk−1,tk) between a pseudo range at the time tk−1 and a pseudo range at the time tk can be approximated as in (expression 7) below. Note that the clock error δT of the positioning satellite SAT in (expression 5) is corrected based on a navigational message.

$$\Delta P(tk-1,tk)=P(tk)-P(tk-1)=\rho(tk)-\rho(tk-1)+\varepsilon p(tk)-\varepsilon p(tk-1) \quad (7)$$

If frequency stability of the positioning apparatus 100 is low, a time difference in clock error c×δt(tk)−c×δt(tk−1) of the positioning apparatus 100 cannot be canceled. Thus, the clock error of the positioning apparatus 100 can be completely canceled by calculating a between-satellite difference ΔVPab(tk−1,tk) between a time difference ΔPa(tk−1,tk) of the positioning satellite SATa and a time difference ΔPb(tk−1,tk) of the positioning satellite SATb. ΔVPab can be calculated from (expression 8):

$$\Delta \nabla Pab(tk-1,tk)=\Delta Pa-\Delta Pb=\rho a(tk)-\rho a(tk-1)-\rho b(tk)+\rho b(tk-1)+\varepsilon pa(tk)-\varepsilon pa(tk-1)-\varepsilon pb(tk)+\varepsilon pb(tk-1) \quad (8)$$

<D. Expression for Time Difference Value Δφ in Carrier Phase Integrated Value>

If the difference between the time tk−1 and the time tk is sufficiently small, and no cycle slip occurs between the time tk−1 and the time tk, a time difference Δφ(tk−1,tk) between a carrier phase integrated value at the time tk−1 and a carrier phase integrated value at the time tk can be approximated as in (expression 9) below. Note that the clock error δT of the positioning satellite SAT in (expression 6) is corrected using a navigational message.

$$\Delta \phi(tk-1,tk)=\phi(tk)-\phi(tk-1)=\rho(tk)-\rho(tk-1)+\varepsilon p(tk)-\varepsilon p(tk-1) \quad (9)$$

If the frequency stability of the positioning apparatus 100 is low, the time difference in clock error c×δt(tk)−c×δt(tk−1) of the positioning apparatus 100 cannot be canceled. Thus, the clock error of the positioning apparatus 100 can be completely canceled by calculating a between-satellite difference ΔVφab(tk−1,tk) between a time difference Δφa(tk−1,tk) of the positioning satellite SATa and a time difference Δφb(tk−1,tk) of the positioning satellite SATb. ΔVφab(tk−1,tk) can be calculated from (expression 10):

$$\Delta \nabla \phi ab(tk-1,tk)=\Delta \phi a-\Delta \phi b=\rho a(tk)-\rho a(tk-1)-\rho b(tk)+\rho b(tk-1)+\varepsilon \phi a(tk)-\varepsilon \phi a(tk-1)-\varepsilon \phi b(tk)+\varepsilon \phi b(tk-1) \quad (10)$$

<F. Calculation of User Position>

ρ(tk) is a function of a user position u(tk) at the time tk, and ρ(tk−1) is a function of a user position u(tk−1) at the time tk−1. Given that u(tk−1) is already known, the user position u(tk) at the time tk and the ambiguity N(tk) at the time tk are calculated from simultaneous equations of (expression 2), (expression 4), (expression 7), and (expression 9), using the least squares method and a Kalman filter. Since (expression 7) and (expression 9) can be formulated for a ranging signal which does not coincide with augmentation information [L6], a user position can be calculated using more ranging signals.

It is possible to completely cancel the clock error of the positioning apparatus 100 and obtain a higher-precision user position from simultaneous equations of (expression 2), (expression 4), (expression 8), and (expression 10), using the least squares method and the Kalman filter.

<G. Drift Correction of Pseudo Range>

If the difference between the time tk−1 and the time tk is large or if positioning over a long time is performed by time difference positioning alone, a drift error bp(tk−1,tk) which is an error generated in a time difference value and is an error varying with passage of time becomes non-negligible, as indicated by (expression 11), and (expression 7) and (expression 9) cannot be approximated. Note that the drift error bp(tk−1,tk) as a pseudo range error is defined individually for a signal of the positioning satellite SAT.

$$\Delta P(tk-1,tk)=P(tk)-P(tk-1)=\rho(tk)-\rho(tk-1)+c \times \delta t(tk)-c \times \delta t(tk-1)+bp(tk-1,tk)+\varepsilon p(tk)-\varepsilon p(tk-1) \quad (11)$$

bp(tk−1,tk) may be approximated by a linear expression of time using a coefficient kp, as in (expression 12):

$$bp(tk-1,tk)=kp \times (tk-(tk-1)) \quad (12)$$

The drift error bp(tk−1,tk) in (expression 11) can be removed at the time of time difference positioning by estimating in advance the drift error coefficient kp. bp(tk−1,tk) is not limited to a linear expression of time and may be a polynomial of time. The time difference value in clock error c×δt(tk)−c×δt(tk−1) of the positioning apparatus 100 may be canceled by taking an intersatellite single difference for (expression 11), like (expression 8) above.

$$\Delta \nabla Pab(tk-1,tk)=\Delta Pa-\Delta Pb=\rho a(tk)-\rho a(tk-1)-\rho b(tk)+\rho b(tk-1)+kpa \times (tk-(tk-1))-kpb \times (tk-(tk-1))+\varepsilon pa(tk)-\rho a(tk-1)-\varepsilon pb(tk)+\varepsilon pb(tk-1) \quad (13)$$

In (expression 13), kpa is a drift error coefficient for a pseudo range of the positioning satellite SATa, and kpb is a drift error coefficient for a pseudo range of the positioning satellite SATb.

<H. Drift Correction of Carrier Phase Integrated Value>

Like drift correction of a pseudo range, an observation equation for a carrier phase integrated value with a drift error $b\phi(tk-1,tk)$ of a carrier phase integrated value taken into account is indicated by (expression 14) below:

$$\Delta\phi(tk-1,tk)=\phi(tk)-\phi(tk-1)=\rho(tk)-\rho(tk-1)+c\times\delta t(tk)-c\times \delta t(tk-1)+b\phi(tk-1,tk)+\epsilon p(tk)-\epsilon p(tk-1) \quad (14)$$

$b\phi(tk-1,tk)$ may be approximated by a linear expression of time, as in (expression 12).

$$b\phi(tk-1,tk)=k\phi\times(tk-(tk-1)) \quad (15)$$

The drift error $b\phi(tk-1,tk)$ in (expression 14) can be removed by estimating in advance a drift error coefficient $k\phi$ for a carrier phase integrated value. $b\phi(tk-1,tk)$ is not limited to a linear expression of time and may be a polynomial of time. The time difference value in clock error $c\times\delta t(tk)-c\times\delta t(tk-1)$ of the positioning apparatus 100 may be canceled by taking an intersatellite single difference for (expression 14), like (expression 10) above.

$$\Delta\nabla\phi ab(tk-1,tk)=\Delta\phi a-\Delta\phi b=\rho a(tk)-\rho a(tk-1)-\rho b(tk)+\rho b(tk-1)+k\phi a\times(tk-(tk-1))-k\phi b\times(tk-(tk-1))+\epsilon\phi a(tk)-\epsilon\phi a(tk-1)-\epsilon\phi b(tk)+\epsilon\phi b(tk-1) \quad (16)$$

In (expression 16), $k\phi a$ is a drift error coefficient for a carrier phase integrated value of the positioning satellite SATa, and $k\phi b$ is a drift error coefficient for a carrier phase integrated value of the positioning satellite SATb.

<I. Calculation of User Position by Drift Correction>

If the drift error coefficient kp for a pseudo range error and the drift error coefficient $k\phi$ for a carrier phase integrated value are determined in advance, a user position can be obtained with high precision by the least squares method or formulation of a Kalman filter on the basis of simultaneous equations of (expression 2), (expression 4), (expression 13), and (expression 16) even in a case where the difference between the time tk−1 and the time tk is large.

<J. Estimation of Drift Error>

The drift error coefficient kp for a pseudo range error and the drift error coefficient $k\phi$ for a carrier phase integrated value are estimated during a time period when sufficient ranging signals coincident with augmentation information [L6] can be secured in, for example, an open sky environment by the procedures below. The user position u(tk−1) at the time tk−1 and the user position u(tk) at the time tk are obtained by the least squares method or a Kalman filter based on simultaneous equations of (expression 2) and (expression 4). Geometric distances $\rho a(tk)$, $\rho a(tk-1)$, $\rho b(tk)$, and $\rho b(tk-1)$ are obtained by substituting the obtained user positions u(tk−1) and u(tk) into (expression 13) and (expression 16). At this time, unknown quantities in (expression 13) and (expression 16) are kpa, kpb, $k\phi a$, and $k\phi b$. kpa, kpb, $k\phi a$, and $k\phi b$ can be estimated by using the least squares method or a Kalman filter based on simultaneous equations of (expression 13) and (expression 16).

Description of Operation

Note that a L1C/A signal of the GPS satellite 311 and a B1C signal of the Beidou satellite 313 are assumed below as ranging signals and that a [L6] signal of the quasi-zenith satellite 312 is assumed as augmentation information.

<Time tk−1 and Time tk in GPS Satellite 311>

The GPS satellite 311 transmits the transmission signal 311a including a L1C/A signal at the time tk−1. In FIG. 3, the transmission signal 311a is received by the antenna 11, passes through the distributor 12, and is subjected to signal processing in the ranging signal reception unit 13. Observation data is generated from the transmission signal 311a subjected to the signal processing by the first decoding unit 21. The observation data is stored in a ranging signal table 31 of the main storage device 30. A navigational message is generated from the transmission signal 311a subjected to the signal processing by the second decoding unit 22. The generated navigational message is passed to the satellite calculation unit 24. The satellite calculation unit 24 passes a satellite position and a satellite time to the positioning operation unit 25. Similarly, observation data is generated at the time tk by the first decoding unit 21, and the observation data is stored in the ranging signal table 31 of the main storage device 30. Processes of the second decoding unit 22 and the third decoding unit 23 at the time tk are the same as the processes of the second decoding unit 22 and the third decoding unit 23 at the time tk−1.

As shown in FIG. 2, the quasi-zenith satellite 312 transmits the transmission signal 312a including not only a L1C/A signal but also augmentation information [L6] before the time tk. Augmentation information [L1C/A] and augmentation information [L2C] for the GPS satellite 311 and augmentation information [L1C/A] and augmentation information [L2C] for the quasi-zenith satellite 312 are included in the augmentation information [L6]. However, the augmentation information [L6] does not include pieces of augmentation information for ranging signals B1C and B2a of the Beidou satellite 313. The augmentation information [L6] included in the transmission signal 312a of the quasi-zenith satellite 312 is received by the antenna 11, passes through the distributor 12, and is subjected to signal processing in the augmentation information reception unit 14. The augmentation information [L6] subjected to the signal processing in the augmentation information reception unit 14 is generated as correction data [L6] by the third decoding unit 23 and is passed to the positioning operation unit 25. Such "correction data" here is correction data [L1C/A] for correcting a ranging signal L1C/A signal, for the ranging signal L1C/A signal of the GPS satellite 311. Correction data is, for example, transmitted at intervals of 30 seconds in succession to the positioning operation unit 25.

<Time tk−1 and Time tk in Beidou Satellite 313>

The Beidou satellite 313 transmits the transmission signal 313a including a B1C signal at the time tk−1. The transmission signal 313a is received by the antenna 11, passes through the distributor 12, and is subjected to signal processing in the ranging signal reception unit 13. Observation data is generated from the transmission signal 313a subjected to the signal processing by the first decoding unit 21. The observation data is stored in the ranging signal table 31 of the main storage device 30. A navigational message is generated from the transmission signal 313a subjected to the signal processing by the second decoding unit 22 and is passed to the satellite calculation unit 24. The satellite calculation unit 24 passes a satellite position and a satellite time to the positioning operation unit 25. Similarly, observation data is generated at the time tk by the first decoding unit 21 and is stored in the ranging signal table 31 of the main storage device 30. Operation of the second decoding unit 22 and the third decoding unit 23 at the time tk is the same as the operation at the time tk−1.

Figure 4:
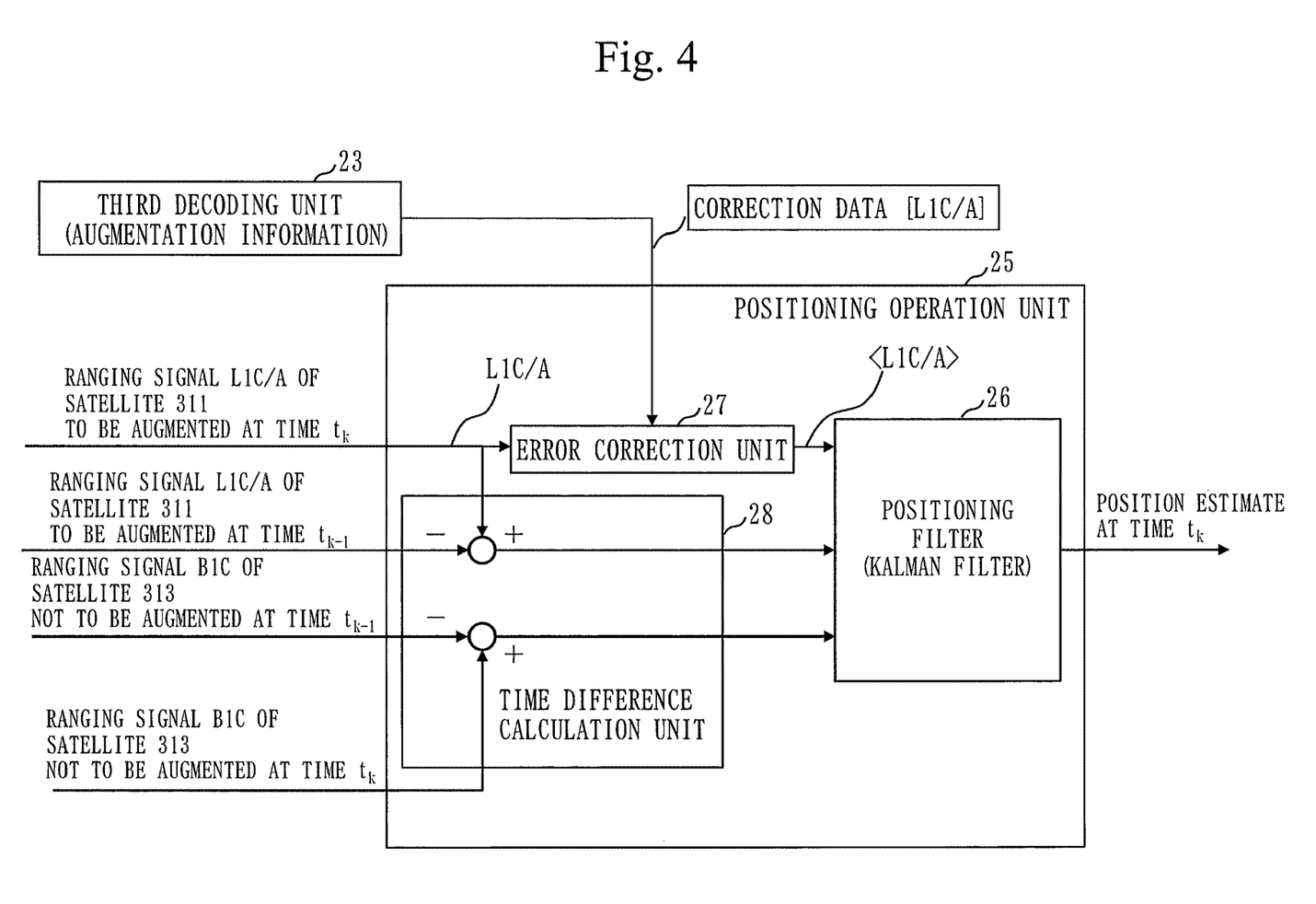
FIG. 4 is a diagram according to Embodiment 1 and is a diagram showing a configuration of a positioning operation unit 25.

FIG. 4 shows a configuration of the positioning operation unit 25. The positioning operation unit 25 includes the positioning filter 26, the error correction unit 27, and the time difference calculation unit 28.

At each of a plurality of times, the decoding unit 70 decodes augmentation information to generate correction data obtained by decoding the augmentation information, decodes a first ranging signal for which augmentation information is provided to generate observation data of the first ranging signal, and decodes a second ranging signal for which augmentation information is not provided to generate observation data of the second ranging signal.

The error correction unit 27 corrects an error in observation data of a first ranging signal on the basis of correction data. The positioning filter 26 performs a positioning operation using the observation data of the first ranging signal, the error of which is corrected by the error correction unit 27, time difference data between pieces of observation data of first ranging signals, and time difference data between pieces of observation data of second ranging signals. As will be described later, time difference data is calculated by the time difference calculation unit 28. A specific description will be given below.

Figure 5:
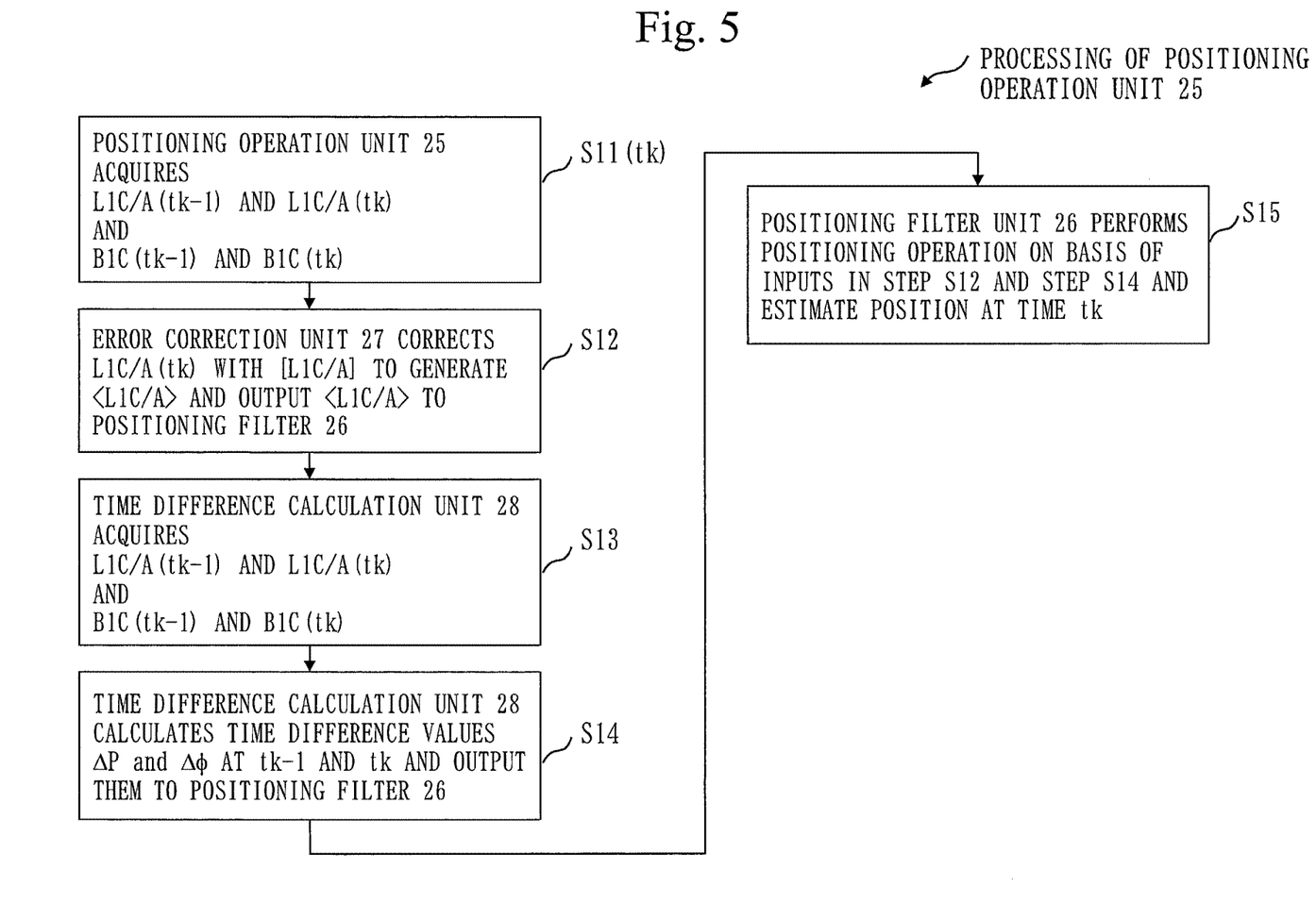
FIG. 5 is a flowchart according to Embodiment 1 and is a flowchart showing operation of the positioning operation unit 25.

FIG. 5 shows a flowchart of operation of the positioning operation unit 25 in FIG. 4. The operation of the positioning operation unit 25 will be described with reference to FIGS. 4 and 5.

<Step S11>

In step S11, the positioning operation unit 25 receives, from the ranging signal table 31, a L1C/A(tk−1) signal at the time tk−1 of the GPS satellite 311 as a satellite to be augmented and a L1C/A(tk) signal at the time tk of the GPS satellite 311. The term "satellite to be augmented" means that the positioning apparatus 100 can receive a ranging signal i and augmentation information [i] for the positioning satellite in question and that the positioning apparatus 100 can correct an error in the ranging signal i using the augmentation information [i]. Similarly, the positioning operation unit 25 receives, from the ranging signal table 31 at the time tk, a B1C(tk−1) signal at the time tk−1 of the Beidou satellite 313 as a satellite not to be augmented and a B1C(tk) signal at the time tk of the Beidou satellite 313.

The term "satellite not to be augmented" means a positioning satellite in which the positioning apparatus 100 cannot receive augmentation information [i] for a ranging signal i of the positioning satellite in question, and the positioning apparatus 100 cannot correct an error in the ranging signal i using the augmentation information [i].

Pieces of information to be acquired from the ranging signal table 31 are as follows. The first decoding unit 21 as a detection unit detects first pseudo ranges P1 and first carrier phase integrated values φ1 from first ranging signals which are ranging signals of a first positioning satellite received at a plurality of times and for which augmentation information for correction is provided. The first positioning satellite here is the GPS satellite 311. Each first ranging signal is a L1C/A signal. The augmentation information for the L1C/A signal is augmentation information [L1C/A].

The first decoding unit 21 also detects second pseudo ranges P2 and second carrier phase integrated values φ2 from second ranging signals which are ranging signals of a second positioning satellite received at a plurality of times and for which augmentation information for correction is not provided. The second positioning satellite here is the Beidou satellite 313. Each second ranging signal is a B1C signal. Augmentation information is not provided for the B1C signal.

The first pseudo range P1 and the first carrier phase integrated value φ1, and the second pseudo range P2 and the second carrier phase integrated value φ2 are acquired from the ranging signal table 31 by the positioning operation unit 25.

An outline of step S12 and subsequent steps is as follows. The positioning operation unit 25 generates a first observation equation for the GPS satellite 311 as the first positioning satellite, using a first pseudo range P1 corrected with augmentation information and a first carrier phase integrated value φ1 corrected with the augmentation information. The positioning operation unit 25 also generates a second observation equation for the Beidou satellite 313 as the second positioning satellite, using a time difference value ΔP2 in second pseudo range P2 and a time difference value Δφ2 in second carrier phase integrated value φ2. The positioning operation unit 25 performs positioning through execution of a filter operation using the first observation equation and the second observation equation by the positioning filter 26. The positioning operation unit 25 outputs an operation result as a position estimate 25a.

<Step S12>

The error correction unit 27 corrects the L1C/A(tk) signal at the time tk of the GPS satellite 311 with correction data [L1C/A] transmitted from the third decoding unit 23, thereby generating a <L1C/A> signal obtained by correcting the L1C/A signal. The generated <L1C/A> signal is input to a Kalman filter which is the positioning filter 26 by the error correction unit 27.

A specific description will be given as follows.

In the positioning operation unit 25, the error correction unit 27 acquires correction data [L1C/A] for a L1C/A signal generated from augmentation information [L1C/A] provided for the L1C/A signal of the GPS satellite 311 that is a first ranging signal, and a first pseudo range P1 and a first carrier phase integrated value φ1 detected by the first decoding unit 21 as the detection unit. The first pseudo range P1 is a pseudo range of the L1C/A signal, and the first carrier phase integrated value φ1 is a carrier phase integrated value of the L1C/A signal. The error correction unit 27 corrects the first pseudo range P1 and the first carrier phase integrated value φ1, using the correction data [L1C/A]. The error correction unit 27 inputs the corrected first pseudo range P1 and first carrier phase integrated value φ1 to the positioning filter 26. As will be described in step S15, the positioning operation unit 25 generates a first observation equation using the first pseudo range P1 and the first carrier phase integrated value φ1 corrected by the error correction unit 27 and executes a filter operation.

<Step S13>

The time difference calculation unit 28 receives the L1C/A(tk−1) signal of the GPS satellite 311 at the time tk−1, the L1C/A(tk) signal of the GPS satellite 311 at the time tk, the B1C(tk−1) signal of the Beidou satellite 313 at the time tk−1, and the B1C(tk) signal of the Beidou satellite 313 at the time tk.

<Step S14>

The time difference calculation unit 28 calculates a time difference value between the ranging signals at the times tk−1 and tk.

That is, the time difference calculation unit 28 calculates a time difference value ΔP(tk−1,tk) and a time difference value Δφ(tk−1,tk) for pseudo ranges and carrier phase integrated values at the times tk and tk−1. The time difference calculation unit 28 inputs the calculated ΔP(tk−1,tk) and Δφ(tk−1,tk) to the positioning filter 26.

<Step S15>

The positioning filter 26 performs a positioning operation on the basis of <L1C/A> input in step S12 and ΔP(tk−1,tk) and Δφ(tk−1,tk) input in step S14 and outputs a position estimate 25a of the positioning apparatus 100 at the time tk.

Modification

Figure 6:
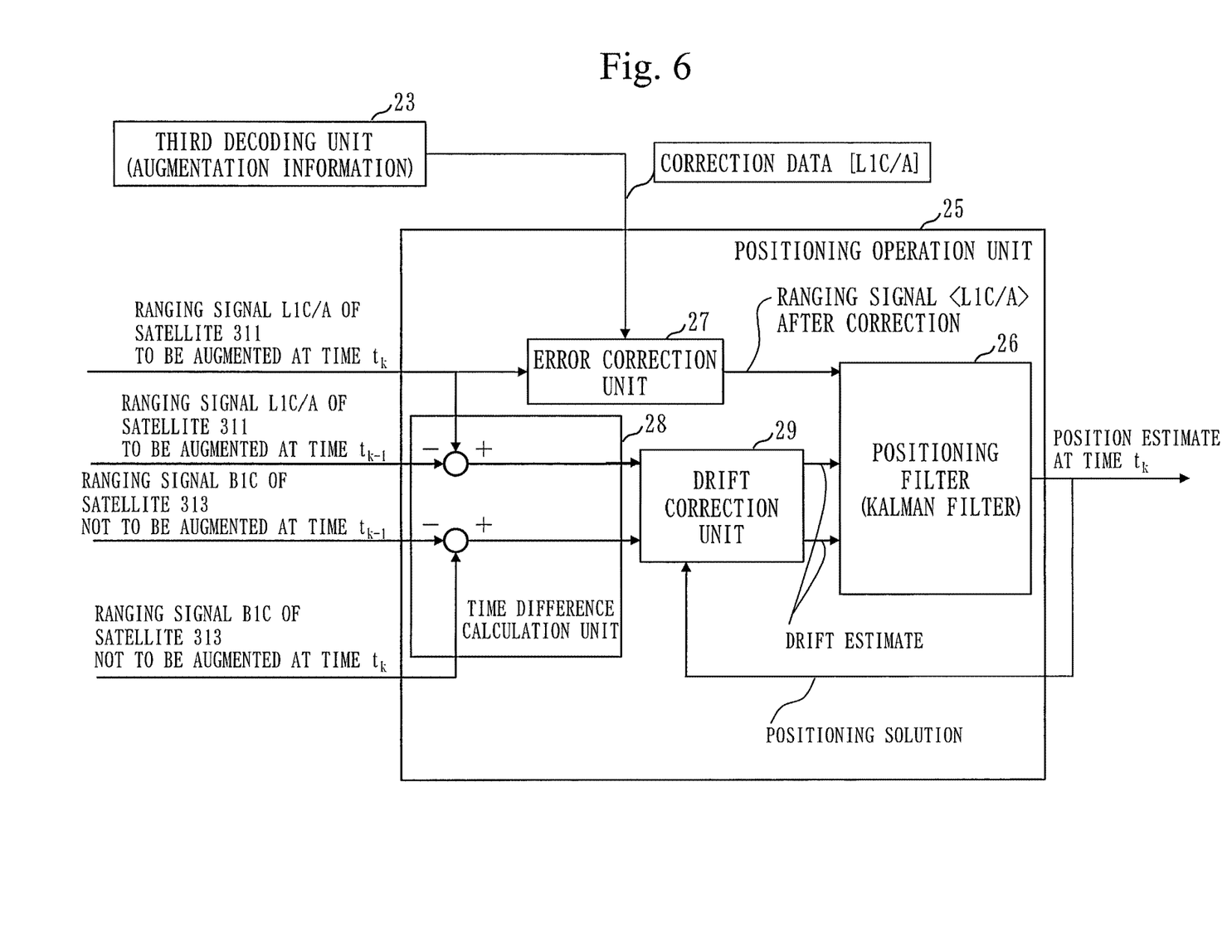
FIG. 6 is a diagram according to Embodiment 1 and is a diagram showing a configuration of a modification of the positioning operation unit 25.

FIG. 6 shows a modification in which the positioning operation unit 25 has the drift correction unit 29.

Figure 7:
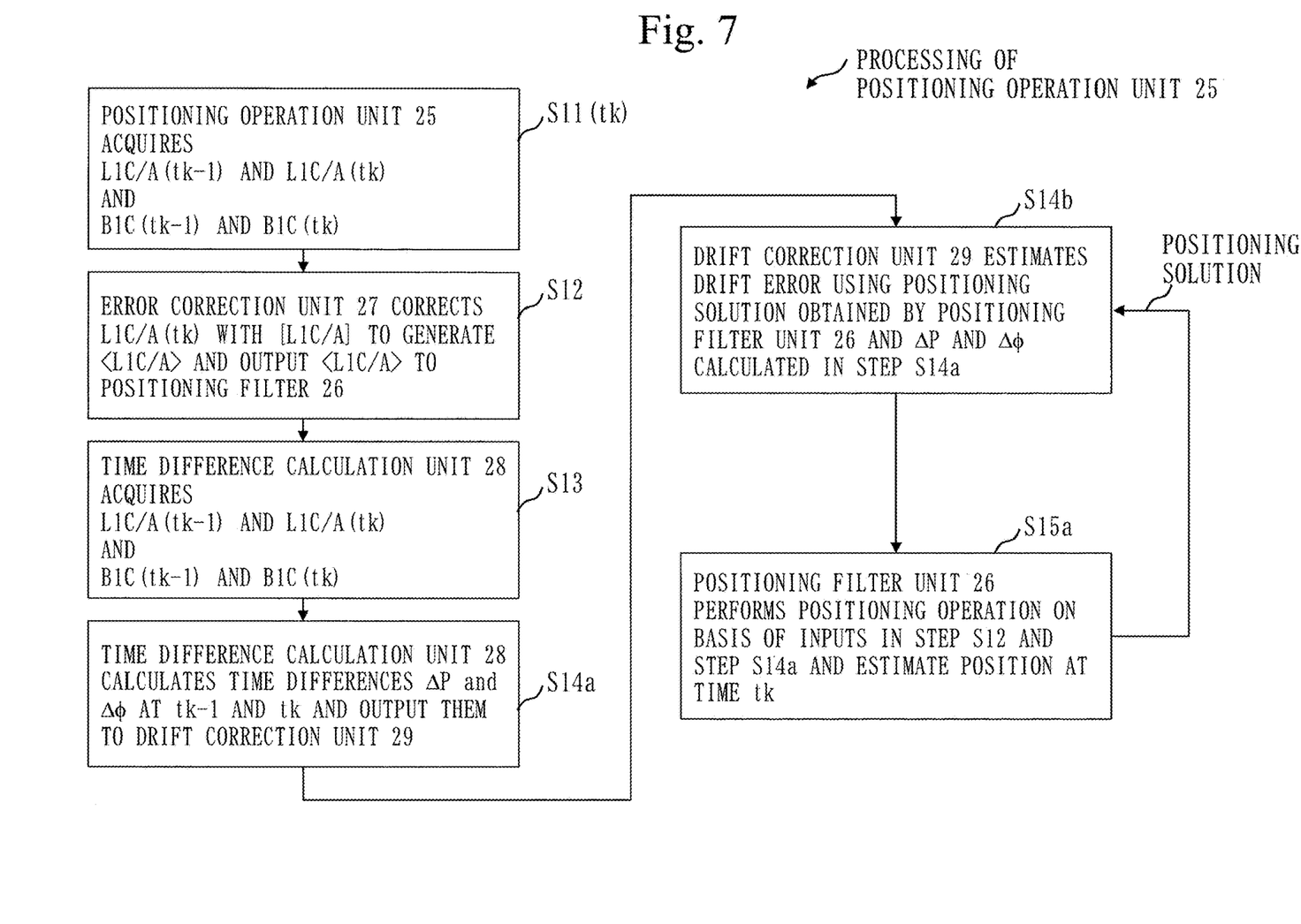
FIG. 7 is a flowchart according to Embodiment 1 and is a flowchart showing operation of the modification of the positioning operation unit 25.

FIG. 7 shows a flowchart of operation of the positioning operation unit 25 having the drift correction unit 29. The flowchart in FIG. 7 is different from the flowchart in FIG. 5 in steps S14a, S14b, and S15a. Only different steps will be described. Note that step S14a corresponds to step S14 and that step S15a corresponds to step S15. Step S14b is peculiar to the flowchart in FIG. 7.

<Step S14a>

In step S14a, the time difference calculation unit 28 outputs calculated $\Delta P(tk-1,tk)$ and $\Delta \phi(tk-1,tk)$ to the drift correction unit 29.

<Step S14b>

In step S14b, the drift correction unit 29 estimates drift errors using a positioning solution obtained by the positioning filter 26 and $\Delta P(tk-1,tk)$ and $\Delta p(tk-1,tk)$ calculated in step S14a and corrects the drift errors in $\Delta P(tk-1,tk)$ and $\Delta \phi(tk-1,tk)$. The drift correction unit 29 outputs $\Delta P(tk-1,tk)$, the drift error of which is corrected, and $\Delta \phi(tk-1,tk)$, the drift error of which is corrected, to the positioning filter 26.

A specific description will be given as follows.

The drift correction unit 29 corrects drift errors which are errors generated in respective time difference values of a time difference value $\Delta P1$ in a first pseudo range P1 that is a pseudo range of a L1C/A signal, a time difference value $\Delta \phi 1$ in a first carrier phase integrated value $\phi 1$ that is a carrier phase integrated value of the L1C/A signal, a time difference value $\Delta P2$ in a second pseudo range P2 that is a pseudo range of a B1C signal, and a time difference value $\Delta \phi 2$ in a second carrier phase integrated value $\phi 2$ that is a carrier phase integrated value of the B1C signal and are errors varying with passage of time, for the respective time difference values.

The positioning operation unit 25 generates a third observation equation for a L1C/A signal, that is, the GPS satellite 311 that transmits a L1C/A signal and generates a second observation equation for a B1C signal, that is, the Beidou satellite 313 that transmits a B1C signal, using respective time difference values, drift errors of which are corrected by the drift correction unit 29.

Note that, as described above, the drift correction unit 29 corrects drift errors for respective time difference values, using a positioning solution as a result of executing a filter operation by the positioning filter 26.

<Step S15a>

In step S15a, the positioning filter 26 performs a positioning operation on the basis of <L1C/A> input in step S12 and $\Delta P(tk-1,tk)$ and $\Delta \phi(tk-1,tk)$, drift errors of which are corrected, input in step S14b and outputs the position estimate 25a of the positioning apparatus 100 at the time tk.

Description of Advantageous Effects of Embodiment 1

According to the positioning apparatus 100 of Embodiment 1, a time difference value in pseudo range and a time difference value in carrier phase integrated value are used for a "satellite not to be augmented", in addition to use of a pseudo range and a carrier phase integrated value corrected with augmentation data for a "satellite to be augmented". This makes it possible to perform precise positioning using, for positioning, a ranging signal i for which augmentation information [i] cannot be received together with a ranging signal k for which augmentation information [k] can be received.

Since $\Delta P(tk-1,tk)$ and $\Delta \phi(tk-1,tk)$, drift errors of which are corrected by the drift correction unit 29, are used, positioning precision can be enhanced.

REFERENCE SIGNS LIST $\delta T$: satellite clock error; $\delta O$: satellite orbit error; B: satellite signal bias; I: ionospheric delay error; T: tropospheric delay error; P: pseudo range; $\phi$: carrier phase integrated value; 10: GNSS reception unit; 11: antenna; 12: distributor; 13: ranging signal reception unit; 14: augmentation information reception unit; 20: processor; 21: first decoding unit; 22: second decoding unit; 23: third decoding unit; 24: satellite calculation unit; 25: positioning operation unit; 25a: position estimate; 26: positioning filter; 27: error correction unit; 28: time difference calculation unit; 29: drift correction unit; 30: main storage device; 31: ranging signal table; 40: auxiliary storage device; 60: signal line; 70: decoding unit; 100:

The invention claimed is:

1. A positioning apparatus comprising:
processing circuitry configured to:
detect first pseudo ranges and first carrier phase integrated values from first ranging signals which are ranging signals of a first positioning satellite received at a plurality of times and are ranging signals for which augmentation information for correction is provided;
detect second pseudo ranges and second carrier phase integrated values from second ranging signals which are ranging signals of a second positioning satellite received at a plurality of times and are ranging signals for which augmentation information for correction is not provided;
acquire correction data for the first ranging signals generated from the augmentation information provided for the first ranging signals;
acquire the first pseudo ranges and the first carrier phase integrated values;
correct the first pseudo ranges and the first carrier phase integrated values using the correction data;
generate a first observation equation for the first positioning satellite using the corrected first pseudo ranges and the corrected first carrier phase integrated values;
generate a second observation equation for the second positioning satellite using a time difference value between the second pseudo ranges detected from the second ranging signals that are the ranging signals for which augmentation information for correction is not provided and a time difference value between the second carrier phase integrated values detected from the second ranging signals that are the ranging signals for which augmentation information for correction is not provided; and
perform positioning by executing a filter operation using the first observation equation and the second observation equation.

2. The positioning apparatus according to claim 1, wherein the processing circuitry:
generates a third observation equation for the first positioning satellite using a time difference value between the first pseudo ranges and a time difference value between the first carrier phase integrated values; and
executes the filter operation using the first observation equation, the second observation equation, and the third observation equation.

3. The positioning apparatus according to claim 2, wherein the processing circuitry:
corrects drift errors which are errors generated in respective time difference values of the time difference value between the first pseudo ranges, the time difference value between the first carrier phase integrated values, the time difference value between the second pseudo ranges, and the time difference value between the second carrier phase integrated values and are errors varying with passage of time, for the respective time difference values; and
generates the first observation equation, the second observation equation, and the third observation equation using the respective time difference values, the drift errors of which are corrected.

4. The positioning apparatus according to claim 3, wherein the processing circuitry corrects the drift errors for the respective time difference values using a positioning solution as a result of executing the filter operation.

5. The positioning apparatus according to claim 2, wherein the processing circuitry executes the filter operation using:
between-satellite differences of time differences in the first pseudo ranges,
between-satellite differences of time differences in the first carrier phase integrated values,
between-satellite differences of time differences in the second pseudo ranges, and
between-satellite differences of time differences in the second carrier phase integrated values.

6. The positioning apparatus according to claim 1, wherein the processing circuitry executes the filter operation using:
between-satellite differences of time differences in the first pseudo ranges,
between-satellite differences of time differences in the first carrier phase integrated values,
between-satellite differences of time differences in the second pseudo ranges, and
between-satellite differences of time differences in the second carrier phase integrated values.

7. The positioning apparatus according to claim 1, wherein the second ranging signals are ranging signals for which augmentation information for correction cannot be provided.

8. The positioning apparatus according to claim 1, wherein the time difference value between the second pseudo ranges detected from the second ranging signals that are the ranging signals for which augmentation information for correction is not provided is calculated as a difference between a second pseudo range detected from the second ranging signals that are the ranging signals for which augmentation information for correction is not provided at a first time and a second pseudo range detected from the second ranging signals that are the ranging signals for which augmentation information for correction is not provided at a second time.

9. The positioning apparatus according to claim 1, wherein the time difference value between the second carrier phase integrated values detected from the second ranging signals that are the ranging signals for which augmentation information for correction is not provided is calculated as a difference between a second carrier phase integrated value detected from the second ranging signals that are the ranging signals for which augmentation information for correction is not provided at a first time and a second carrier phase integrated value detected from the second ranging signals that are the ranging signals for which augmentation information for correction is not provided at a second time.

10. The positioning apparatus according to claim 1, wherein the filter operation includes a Kalman filter to calculate a user position using simultaneous equations based on the first observation equation and the second observation equation.

11. The positioning apparatus according to claim 1, wherein the second ranging signals are signals transmitted by a Beidou satellite.

12. The positioning apparatus according to claim 1, wherein the second observation equation is generated using a geometric distance between the positioning apparatus and the second positioning satellite approximated by the time difference value between the second pseudo ranges detected from the second ranging signals that are the ranging signals for which augmentation information for correction is not provided and the time difference value between the second carrier phase integrated values detected from the second ranging signals that are the ranging signals for which augmentation information for correction is not provided.

13. A non-transitory computer-readable medium storing a positioning program that causes a computer to execute a method, the method comprising:
detecting first pseudo ranges and first carrier phase integrated values from first ranging signals which are ranging signals of a first positioning satellite received at a plurality of times and are ranging signals for which augmentation information for correction is provided;
detecting second pseudo ranges and second carrier phase integrated values from second ranging signals which are ranging signals of a second positioning satellite received at a plurality of times and are ranging signals for which augmentation information for correction is not provided;
acquiring correction data for the first ranging signals generated from the augmentation information provided for the first ranging signals;
acquiring the first pseudo ranges and the first carrier phase integrated values;
correcting the first pseudo ranges and the first carrier phase integrated values using the correction data; and
generating a first observation equation for the first positioning satellite using the corrected first pseudo ranges and the corrected first carrier phase integrated values;
generating a second observation equation for the second positioning satellite using a time difference value between the second pseudo ranges detected from the second ranging signals that are the ranging signals for which augmentation information for correction is not provided and a time difference value between the second carrier phase integrated values detected from the second ranging signals that are the ranging signals for which augmentation information for correction is not provided; and
performing positioning by executing a filter operation using the first observation equation and the second observation equation.

14. A positioning method comprising:
detecting first pseudo ranges and first carrier phase integrated values from first ranging signals which are ranging signals of a first positioning satellite received at a plurality of times and are ranging signals for which augmentation information for correction is provided;
detecting second pseudo ranges and second carrier phase integrated values from second ranging signals which are ranging signals of a second positioning satellite received at a plurality of times and are ranging signals for which augmentation information for correction is not provided;

acquiring correction data for the first ranging signals generated from the augmentation information provided for the first ranging signals;

acquiring the first pseudo ranges and the first carrier phase integrated values;

correcting the first pseudo ranges and the first carrier phase integrated values using the correction data;

generating a first observation equation for the first positioning satellite using the corrected first pseudo ranges and the corrected first carrier phase integrated values;

generating a second observation equation for the second positioning satellite using a time difference value between the second pseudo ranges detected from the second ranging signals that are the ranging signals for which augmentation information for correction is not provided and a time difference value between the second carrier phase integrated values detected from the second ranging signals that are the ranging signals for which augmentation information for correction is not provided; and performing positioning by executing a filter operation using the first observation equation and the second observation equation.

15. A positioning apparatus comprising:

processing circuitry configured to:

decode augmentation information to generate correction data obtained by decoding the augmentation information;

decode first ranging signals for which augmentation information is provided to generate pieces of observation data of the first ranging signals;

decode second ranging signals for which augmentation information is not provided to generate pieces of observation data of the second ranging signals at a plurality of times; and correct errors in the pieces of observation data of the first ranging signals on the basis of the correction data; and a positioning filter to perform a positioning operation using:

the error corrected pieces of observation data of the first ranging signals, time difference data between the pieces of observation data of the first ranging signals, and time difference data between the pieces of observation data of the second ranging signals for which augmentation information is not provided.

* * * * *